US012223305B2

(12) United States Patent
Galgali et al.

(10) Patent No.: US 12,223,305 B2
(45) Date of Patent: Feb. 11, 2025

(54) METHODS AND SYSTEMS FOR DEPLOYMENT OF SERVICES

(71) Applicant: salesforce.com, inc., San Francisco, CA (US)

(72) Inventors: Vaishnavi Vithal Galgali, San Jose, CA (US); Arpeet Kale, San Jose, CA (US)

(73) Assignee: Salesforce, Inc., San Francisco, CA (US)

(*) Notice: Subject to any disclaimer, the term of this patent is extended or adjusted under 35 U.S.C. 154(b) by 68 days.

(21) Appl. No.: 17/302,307

(22) Filed: Apr. 29, 2021

(65) Prior Publication Data

US 2022/0350587 A1 Nov. 3, 2022

(51) Int. Cl.
*G06F 8/65* (2018.01)
*G06F 16/23* (2019.01)

(52) U.S. Cl.
CPC ............ *G06F 8/65* (2013.01); *G06F 16/2365* (2019.01); *G06F 16/2379* (2019.01)

(58) Field of Classification Search
CPC ..... G06F 8/65; G06F 16/2379; G06F 16/2365
USPC ......................................................... 717/173
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |

(Continued)

FOREIGN PATENT DOCUMENTS

WO WO-2005076129 A1 * 8/2005 ............... G06F 8/71

OTHER PUBLICATIONS

Aksenova et al., "an Orchestrator to deploy distributed services in cloud environments", 2020, [Online], pp. 57-63, [Retrieved from internet on Nov. 1, 2024], <https://ieeexplore.ieee.org/stamp/stamp.jsp?arnumber=9394140&casa_token=r8CyCly8ZqkAAAAA:ICcsaZvrt8no1YpsH3gfzCp1_2kC5lwhnxlFy07sqgjNGzT-udGECR>.*

(Continued)

*Primary Examiner* — Thuy Dao
*Assistant Examiner* — Zengpu Wei
(74) *Attorney, Agent, or Firm* — Weaver Austin Villeneuve & Sampson LLP

(57) ABSTRACT

Systems and methods for deploying services may include accessing configuration data associated with a service to be deployed, the configuration data generated independently of the service and configured to include environment-related data and infrastructure-related data, the environment-related data identifying at least versioning information associated with the service, and the infrastructure-related data identifying at least artifact repository information associated with the service; accessing data related to a packaged service from an artifact repository based on the artifact repository information, the packaged service generated by a package manager based on the service; updating the packaged service using the environment-related data to generate an updated packaged service; and causing the updated packaged service to be deployed to a deployment destination.

20 Claims, 12 Drawing Sheets

(56) References Cited

U.S. PATENT DOCUMENTS

| | | | |
|---|---|---|---|
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec et al. |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,062,502 | B1 | 6/2006 | Kesler |
| 7,069,231 | B1 | 6/2006 | Cinarkaya et al. |
| 7,069,497 | B1 | 6/2006 | Desai |
| 7,100,111 | B2 | 8/2006 | McElfresh et al. |
| 7,181,758 | B1 | 2/2007 | Chan |
| 7,269,590 | B2 | 9/2007 | Hull et al. |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,508,789 | B2 | 3/2009 | Chan |
| 7,599,935 | B2 | 10/2009 | La Rotonda et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,779,039 | B2 | 8/2010 | Weissman et al. |
| 7,779,475 | B2 | 8/2010 | Jakobson et al. |
| 7,827,208 | B2 | 11/2010 | Bosworth et al. |
| 7,827,548 | B1 * | 11/2010 | Anderson ............... G06F 8/63 717/174 |
| 7,853,881 | B1 | 12/2010 | Aly Assal et al. |
| 7,945,653 | B2 | 5/2011 | Zukerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,073,850 | B1 | 12/2011 | Hubbard et al. |
| 8,082,301 | B2 | 12/2011 | Ahlgren et al. |
| 8,095,413 | B1 | 1/2012 | Beaven |
| 8,095,531 | B2 | 1/2012 | Weissman et al. |
| 8,095,594 | B2 | 1/2012 | Beaven et al. |
| 8,103,611 | B2 | 1/2012 | Tuzhilin et al. |
| 8,150,913 | B2 | 4/2012 | Cheah |
| 8,209,308 | B2 | 6/2012 | Rueben et al. |
| 8,209,333 | B2 | 6/2012 | Hubbard et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 8,661,406 | B2 * | 2/2014 | Shapiro ............... G06F 8/30 717/172 |
| 8,938,734 | B2 * | 1/2015 | Misovski ............... G06F 8/61 717/172 |
| 11,397,569 | B2 * | 7/2022 | Vihar ............... G06F 8/38 |
| 2001/0044791 | A1 | 11/2001 | Richter et al. |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0117161 A1* | 4/2016 | Parthasarathy ......... H04L 67/06 717/171 |
| 2017/0115978 A1* | 4/2017 | Modi .................. G06F 8/65 |
| 2018/0046446 A1* | 2/2018 | Turovsky ............... G06F 9/455 |
| 2018/0260409 A1* | 9/2018 | Sundar ................. G06F 16/172 |
| 2020/0151038 A1* | 5/2020 | Lingamneni ............. G06F 8/31 |
| 2021/0397429 A1* | 12/2021 | Gonzalez ................. G06F 8/65 |
| 2022/0244949 A1* | 8/2022 | Iqbal ...................... G06F 9/547 |
| 2022/0269495 A1* | 8/2022 | Guan ..................... H04L 67/10 |
| 2022/0326930 A1* | 10/2022 | Nandavar ............... G06F 8/65 |

OTHER PUBLICATIONS

Truyen et al., "Evaluation of container orchestration systems for deploying and managing NoSQL database clusters", 2018, [Online], pp. 468-475, [Retrieved from internet on Nov. 1, 2024], <https://ieeexplore.ieee.org/stamp/stamp.jsp?arnumber=8457834&_casa_token=7W7_YOadRdMAAAAA:grXIEzme_uAvNIA40z17j43Hr> (Year: 2018).*

"Google Plus Users", Google+Ripples, Oct. 31, 2011 [retrieved on Feb. 21, 2012 from Internet at http://www.googleplusers.com/google-ripples.html], 3 pages.

* cited by examiner service-A:
  deploy_name: service-A
  chart_repo: https://dummy-account.jfrog.io/helm
  namespace: service-A
  timeout: 300

*FIG. 4B2* service-A:
  app_version: 1.51
  chart_version: '0.27'

*FIG. 4B1*

```
service-A:
  app_version: 1.51
  chart_version: '0.27'
service-B:
  app_version: 1.46
  chart_version: '0.30'
service-C:
  app_version: '1.33'
  chart_version: '0.34'
```

*FIG. 4C1*

```
service-A:
  deploy_name: service-A
  chart_repo: https://dummy-account.jfrog.io/metamind/helm
  namespace: service-A
  timeout: 300
service-B:
  deploy_name: service-B
  chart_repo: https://dummy-account.jfrog.io/metamind/helm
  namespace: service-B
  timeout: 300
service-C:
  deploy_name: service-C
  chart_repo: https://dummy-account.jfrog.io/metamind/helm
  namespace: service-C
  timeout: 300
```

*FIG. 4C2*

METHODS AND SYSTEMS FOR DEPLOYMENT OF SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to deployment of services.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

Many web applications and services may be deployed to Kubernetes clusters in a cloud environment. A Kubernetes cluster is a set of node machines for running web applications and services. The Kubernetes objects for the services may be packaged and deployed using Helm. Although, Helm makes it easy to package Kubernetes objects as Helm charts, deploying Helm charts across multiple environments and clusters can be a challenge, especially when the behavior of service changes with respect to the environment it is deployed.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

FIG. 4A is an example block diagram that shows relationship between the configuration data and the environment-related data and the infrastructure-related data, in accordance with some implementations.

FIGS. 4B1 and 4B2 show examples of environment-related data and infrastructure-related data for deployment of a service, in accordance with some implementations.

FIGS. 4C1 and 4C2 show examples of environment-related data and infrastructure-related data for deployment of multiple services, in accordance with some implementations.

DETAILED DESCRIPTION

Figure 1:
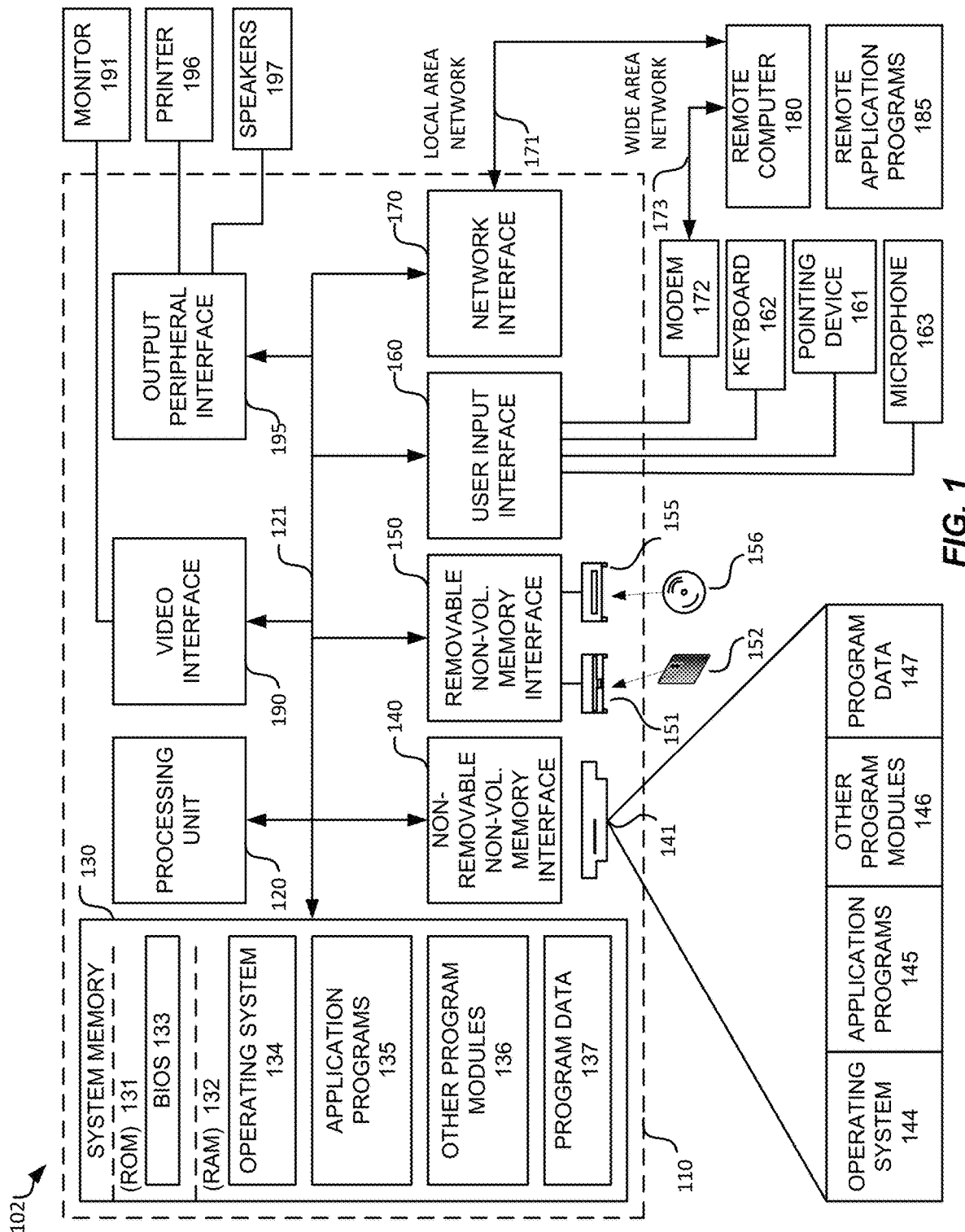
FIG. 1 shows a diagram of an example computing system that may be used with some implementations.

In some implementations, a method for deploying services to clusters may be disclosed. A deployment orchestrator may be packaged as a container that includes necessary libraries to execute in an environment such as a cloud environment or a local environment. The deployment orchestrator may be stored in an artifact repository and may be retrieved or downloaded for execution in the appropriate environment. During execution, the deployment orchestrator may be configured to access configuration data from an artifact repository. The configuration data may include environment-related data and infrastructure-related data. The deployment orchestrator may use the environment-related data and the infrastructure-related data to update a packaged service and to cause the updated packaged service to be deployed. The cluster may be a Kubernetes cluster.

Examples of systems and methods associated with implementing a deployment orchestrator to deploy services to clusters will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a computer-implemented method for deploying services and may include accessing configuration data associated with a service to be deployed, the configuration data generated independently of the service and configured to include environment-related data and infrastructure-related data, the environment-related data identifying at least versioning information associated with the service, and the infrastructure-related data identifying at least artifact repository information associated with the service; accessing data related to a packaged service from an artifact repository based on the artifact repository information, the packaged service generated by a package manager based on the service; updating the packaged service using the environment-related data to generate an updated packaged service; and causing the updated packaged service to be deployed to a deployment destination.

The disclosed implementations may include a system for deploying services and may include one or more processors, and a non-transitory computer readable medium storing a plurality of instructions, which when executed, cause the one or more processors of a server computing system to cause accessing configuration data associated with a service to be deployed, the configuration data generated independently of the service and configured to include environment-related data and infrastructure-related data, the environment-related data identifying at least versioning information associated with the service, and the infrastructure-related data identifying at least artifact repository information associated with the service; accessing data related to a packaged service from an artifact repository based on the artifact repository information, the packaged service generated by a package manager based on the service; updating the packaged service using the environment-related data to generate an updated packaged service; and causing the updated packaged service to be deployed to a deployment destination.

The disclosed implementations may include a computer program product comprising computer-readable program code to be executed by one or more processors of a server computing system when retrieved from a non-transitory computer-readable medium, the program code including instructions to access configuration data associated with a service to be deployed, the configuration data generated independently of the service and configured to include environment-related data and infrastructure-related data, the environment-related data identifying at least versioning information associated with the service, and the infrastructure-related data identifying at least artifact repository information associated with the service; access data related to a packaged service from an artifact repository based on the artifact repository information, the packaged service generated by a package manager based on the service; update the packaged service using the environment-related data to generate an updated packaged service; and cause the updated packaged service to be deployed to a deployment destination.

While one or more implementations and techniques are described with reference to deploying services to clusters using a deployment orchestrator implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. For example, the migrated data may be stored in a source control system and then exposed through a virtual file system.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 is a diagram of an example computing system that may be used with some implementations. The computing system 110 in diagram 102, may be used by a developer or a service owner to download a deployment orchestrator from an artifact repository and execute the deployment orchestrator to cause services to be deployed in one or more clusters. The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, California or an operating system (e.g., Android) that is developed by Google Inc. of Mountain View, California.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples with various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random-access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
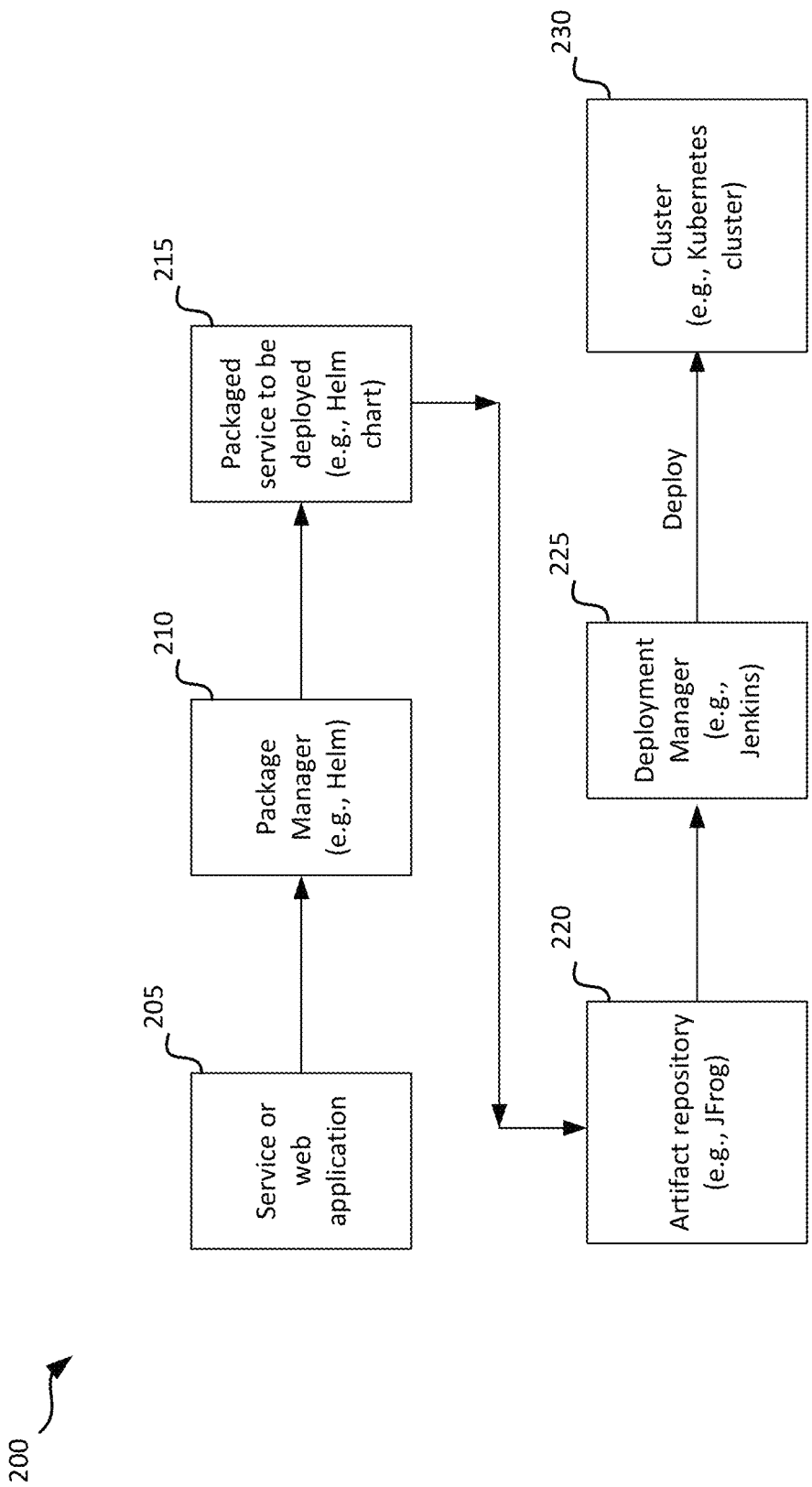
FIG. 2 is an example block diagram that shows one deployment technique, in accordance with some implementations

FIG. 2 is an example block diagram that shows one deployment technique, in accordance with some implementations. Diagram 200 may include components that enable deployment of a service or web application 205. The service/web application 205 may be deployed to a cluster such as, for example, a Kubernetes cluster. Package manager 210 may be used to package the service 205 with resources to generate packaged service 215. For example, the package manager 210 may be Helm, and the service or web application 205 may be packaged using a packaging format called charts. Helm is an open source Kubernetes package manager used to install and manage Kubernetes applications/services. A chart is a collection of files that describe a related set of Kubernetes resources that may be necessary to run a Kubernetes application in a Kubernetes cluster. For example, the packaged service 215 may be a Helm chart. The packaged service 215 may be stored in an artifact repository 220. For example, the artifact repository 220 may be a repository manager from JFrog Artifactory in Sunnyvale, California. When the packaged service 215 is deployed to a cluster 230 (e.g., a Kubernetes cluster), a deployment manager 225 may be used. For example, the deployment manager may be Jenkins, and the packaged service may be deployed as a Helm chart. Jenkins is an open source automation server.

Figure 4:
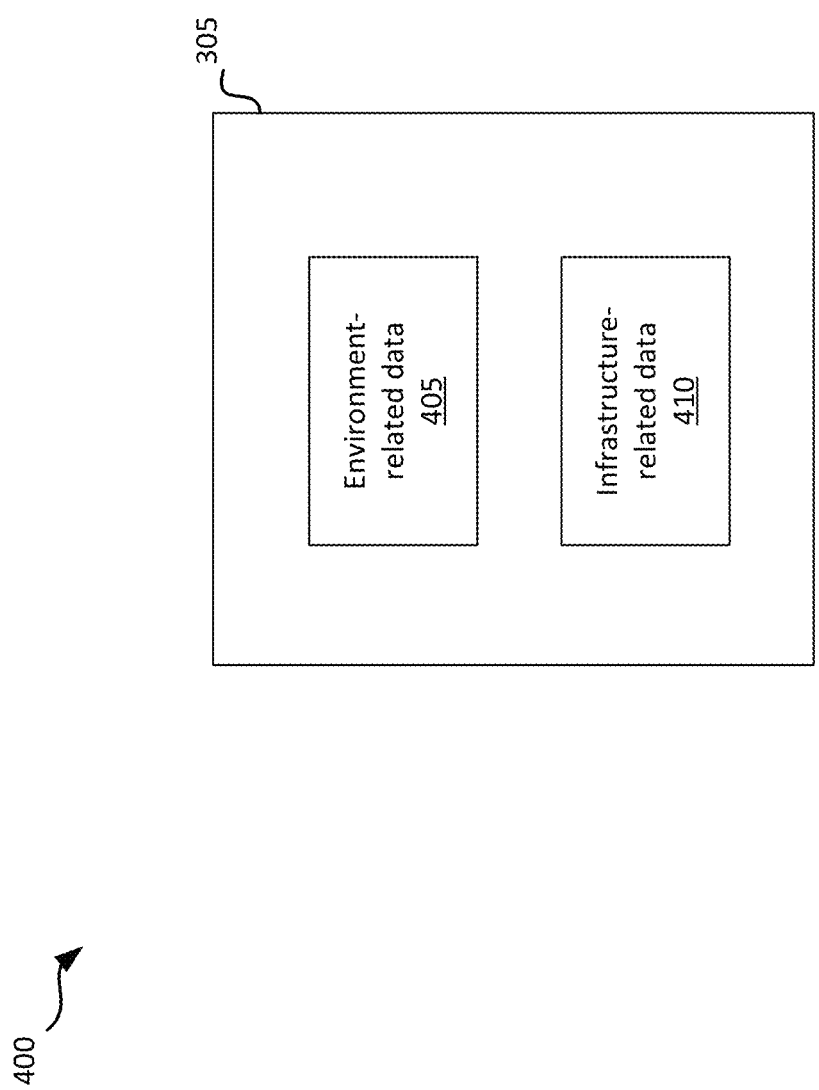

In some implementations, the packaged service 215 may be associated with environment-related data 405 and infrastructure-related data 410 (shown in FIG. 4A). For example, the environment-related data 405 may include data identifying a version of a packaged service 215 to be deployed, and the infrastructure-related data 410 may include data identifying a name and a location of a packaged service 215 to be deployed. The deployment technique described with FIG. 2 may have some limitations. For example, when the packaged service 215 is a Helm chart, the environment-related data 405 and the infrastructure-related data 410 associated with the Helm chart may be assigned values during built time. However, there is no option to update those values during run time. As another example, it may be difficult to keep track of changes to a packaged service 215 and map it to a version.

Figure 3:
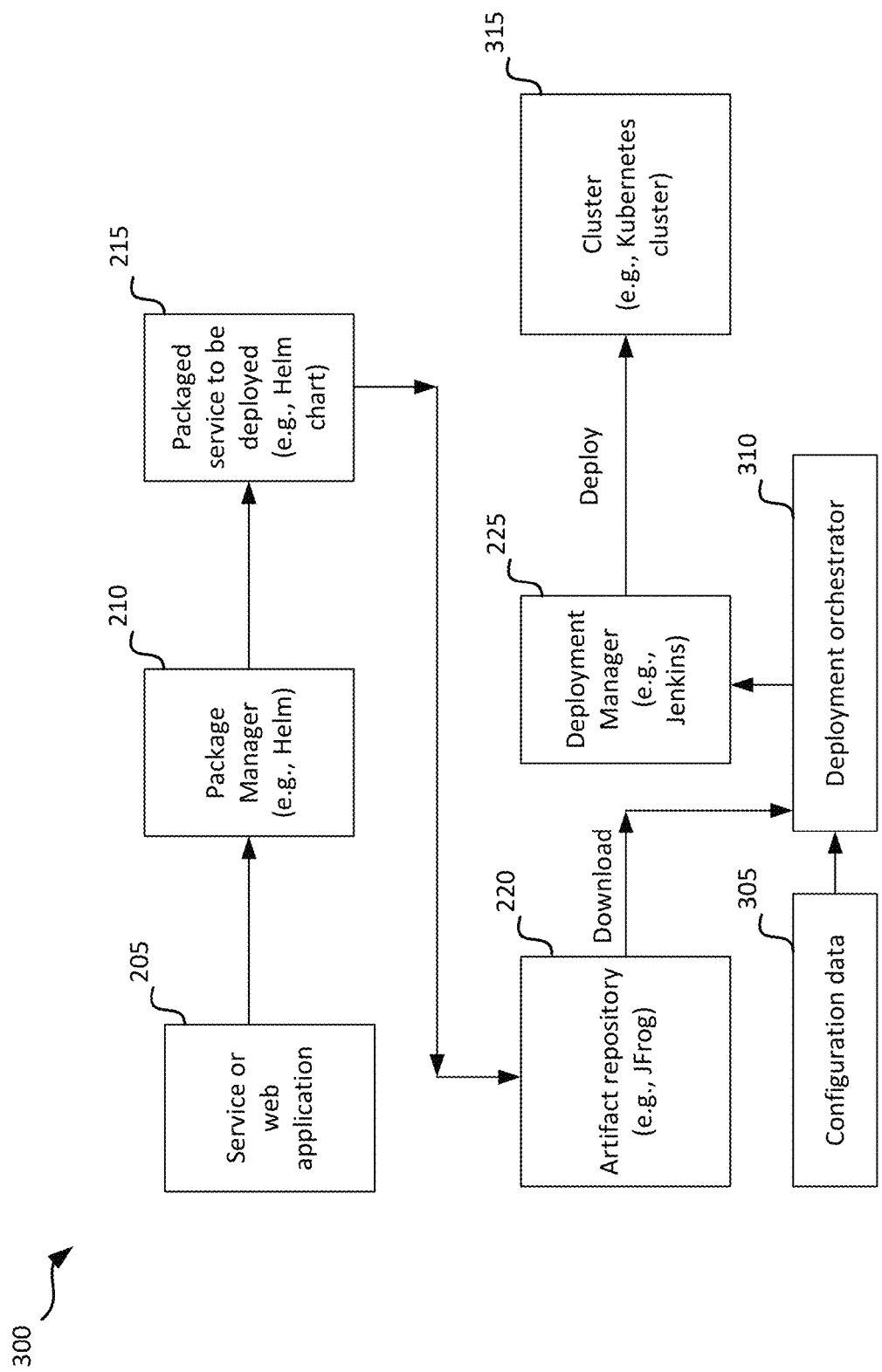
FIG. 3 is an example block diagram that shows an improved deployment technique, in accordance with some implementations.

FIG. 3 is an example block diagram that shows an improved deployment technique, in accordance with some implementations. Diagram 300 includes components that are similar to the components included in diagram 200, with the addition of the deployment orchestrator 310 and the configuration data 305. In some implementations, the deployment orchestrator 310 may be configured as a container such as, for example, a Docker container, and may be stored in an artifact repository. The deployment orchestrator 310 may be implemented using python programming language. The deployment orchestrator 310 may be downloaded from the artifact repository and execute to orchestrate the deployment of the service 205.

The deployment orchestrator 310 may be configured to download the packaged service 215 (e.g., the Helm chart) from the artifact repository 220. The deployment orchestrator 310 may be configured to access configuration data 305 and use the configuration data 305 to update the packaged service 215 during run time. In some implementations, the configuration data 305 may include environment-related data 405 and infrastructure-related data 410 (as shown in diagram 400 of FIG. 4A). In some implementations, the environment-related data 405 may be stored in a bom.yaml configuration file, where "bom" represents "bill of material", and "yaml" represents "yaml ain't markup language". FIG. 4B1 shows an example environment-related data 405 in a bom.yaml file. In some implementations, the infrastructure-related data 410 may be stored in a fabric.yaml configuration file. FIG. 4B2 shows an example of infrastructure-related data 410 in a fabric.yaml configuration file.

In some implementations, the configuration data 305 may be maintained by service owners or administrators associated with the service. The configuration data 305 may be generated independently of or external to the service. The configuration data 305 may be stored in a repository (e.g., GitHub repository). The deployment orchestrator 310 may be configured to read the configuration data 305 and incorporate them into the docker container associated with the deployment orchestrator 310.

The deployment orchestrator 310 may be configured to retrieve a packaged service 215 from the artifact repository 220 based on the information included in the configuration data 305. In some implementations, the packaged service 215 may be generic with regard to certain configurable values. For example, the packaged service 215 may not have any values related to versioning such as a version of an application associated with the service and a version associated with a packaged service (e.g., Helm chart). Without the versioning information, it may be difficult to map a version of an application to a version of a packaged service. The deployment orchestrator 310 may use the values in the bom.yaml configuration file and the fabric.yaml configuration file to expand the values in the packaged service (e.g., Helm charts) 215 to enable the packaged service 215 to be deployable in the cluster 315. For example, the deployment orchestrator 310 may be configured to read the fabric.yaml configuration file shown in FIG. 4B2 for infrastructure details such as Kubernetes namespace, number of replicas and deployment timeout information. The deployment orchestrator 310 may be configured to read the content of the bom.yaml configuration file shown in FIG. 4B1 for application details such as app_version and Helm chart_version to update the packaged service 215 (e.g., Helm charts) during run time and then send the updated packaged service to the deployment manager 225 (e.g., Jenkins) for deployment to a cluster 315 (e.g., Kuberneste cluster).

When the deployment orchestrator 310 downloads a packaged service 215 from the artifact repository 220, the deployment orchestrator 310 may access the environment-related data 405 from the bom.yaml configuration file (as shown in FIG. 4B1). For example, the deployment orchestrator 310 may identify that the service to be deployed is "service A", the version of the application associated with the "service A" is "1.51", and the version of the Helm chart associated with the "service A" is "0.27". The deployment orchestrator 310 may access the infrastructure-related data 410 from the fabric.yaml configuration file (as shown in FIG. 4B2). For example, using the "service-A" from the bom.yaml configuration file, the deployment orchestrator 310 may identify the infrastructure-related data 410 for "service A" to include the deployment name used for the "service A", the location of the Helm chart in the artifact repository, the name space associated with the cluster (e.g., Kubernetes) used to deploy the updated packaged service, and the timeout value to wait before the deployment orchestrator 310 verifies the status of the deployment to determine whether the deployment is successful. When the deployment is not successful, the deployment orchestrator 310 may be configured to exit and generate a notification to indicate the failure of the deployment. Alternatively, a notification of a successful deployment may be generated.

The deployment orchestrator 310 may be configured to determine a current state of a packaged service. For example, the deployment orchestrator may verify with the desired cluster whether the same packaged service has previously been deployed, and if so, may acquire the current state of the packaged service. When the current state is similar to the desired state, the deployment orchestrator 310 may not deploy the updated packaged service. However, when the current state is not as updated as the desired state, the deployment orchestrator 310 may deploy the updated packaged service.

In some implementations, the deployment orchestrator 310 may be configured to use the configuration data 305 to automate the deployment of updated packaged services (e.g., Helm charts) to multiple clusters (e.g., Kubernetes clusters). FIG. 4C1 shows an example environment-related data 405 that may be stored in a bom.yaml configuration file to support the deployment of multiple services such as "service-A", "service-B" and "service-C". FIG. 4C2 shows an example infrastructure-related data 410 that may be stored in a fabric.yaml configuration file to support the deployment of "service-A", "service-B" and "service-C". Following is an example docker run command together with options to deploy a service to a Kubernetes cluster. The example docker run command may be issued by a service administrator. The options for the docker run command may include the location of the deployment orchestrator, the bom.yaml configuration file and the fabric.yaml configuration file, the service name, the user name and password for the artifact repository to download the necessary files and service.

```
docker run
-v ~/.kube/<PROD-EKS-CLUSTER-CONFIG>:/.kube/config \
-v ~/.aws/:/.aws/ \
-v $WORKSPACE/bom/dev_bom.yaml:<WORKING-DIR>/dev_bom.yaml \
-v $WORKSPACE/infra/dev_fabric.yaml:<WORKING-DIR>/dev_fabric.yaml \
metamind-docker.jfrog.io/metamind/deployment-orchestrator:latest \
--bom_file=<WORKING-DIR>/dev_bom.yaml \
--fabric_file=<WORKING-DIR>/dev_fabric.yaml \
--service_names=$APPLICATION \
--command="deploy" \
--local=false \
--region="eu-west-1" \
--artifactory_username=$ARTIFACTORY_USER \
--artifactory_password=$ARTIFACTORY_KEY
```

The above options to the example docker run command include the location of the deployment orchestrator, the directories of the bom.yaml and fabric.yaml configuration files, the name of the service to be deployed, an identifier to indicate whether the service is to be deployed locally, the region where the service is to be deployed, and the username and password to access the artifact repository. As noted above, the deployment orchestrator may be configured as a docker container. The values in the bom.yaml configuration file and fabric.yaml configuration file (examples shown in FIGS. 4B1 and 4B2) may then be accessed and used to deploy the service. When the service is deployed, the status of the deployment may be verified after the time out specified in the infrastructure-related configuration data 410.

Figure 5:
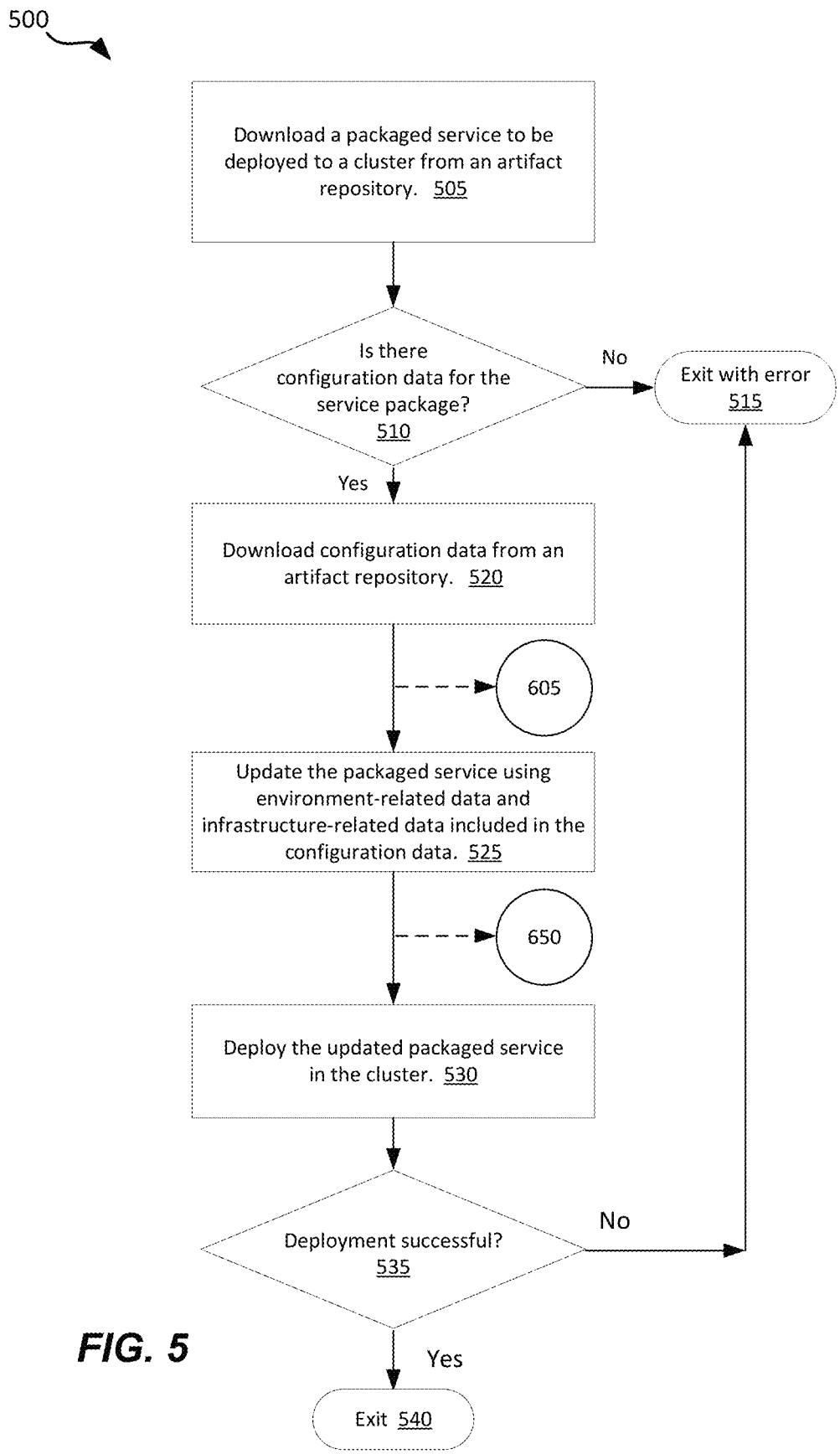
FIG. 5 shows an example flow diagram of a process that may be used to deploy a service, in accordance with some implementations.

FIG. 5 shows an example flow diagram of a process that may be used to deploy a service, in accordance with some implementations. The process shown in diagram 500 may be associated with a deployment orchestrator (e.g., deployment orchestrator 305). The deployment orchestrator may be stored in a repository manager and may be downloaded from the repository manager for execution. At block 505, execution of the deployment orchestrator may cause a packaged service associated with a service downloaded from a repository manager. The packaged service may be deployed to a cluster, or it may be deployed in a local environment. A package manager such as, for example, Helm, may be used to generate the packaged service. The packaged service, for example, may be a Helm chart. The execution of the deployment orchestrator may be triggered by a triggering event as part of a job in a continuous integration/continuous delivery (CI/CD) pipeline. For example, the triggering event may be an instruction to deploy a service to a cluster. Alternatively, the execution of the deployment orchestrator may be triggered by a service administrator.

The deployment orchestrator may be configured to access configuration data 305 which may store data that can be used to update the packaged service. The configuration data 305 may be generated and maintained by a service owner or administrator and may include environment-related data 405 and infrastructure-related data 410 (shown in FIG. 4A). The configuration data 305 may be stored in an artifact repository. At block 510, a test may be performed to determine if there is configuration data 305 for the packaged service. When no configuration data 305 is found, the process may end at block 515, and an error notification may be generated. From block 510, when the configuration data 305 for the packaged service is found, the process may flow to block 520 where the configuration data 305 may be downloaded from an artifact repository. From block 520, the process may flow to block 525 where the packaged service may be updated using the environment-related data 405 and the infrastructure-related data 410 included in the configuration data 305.

Figure 6A:
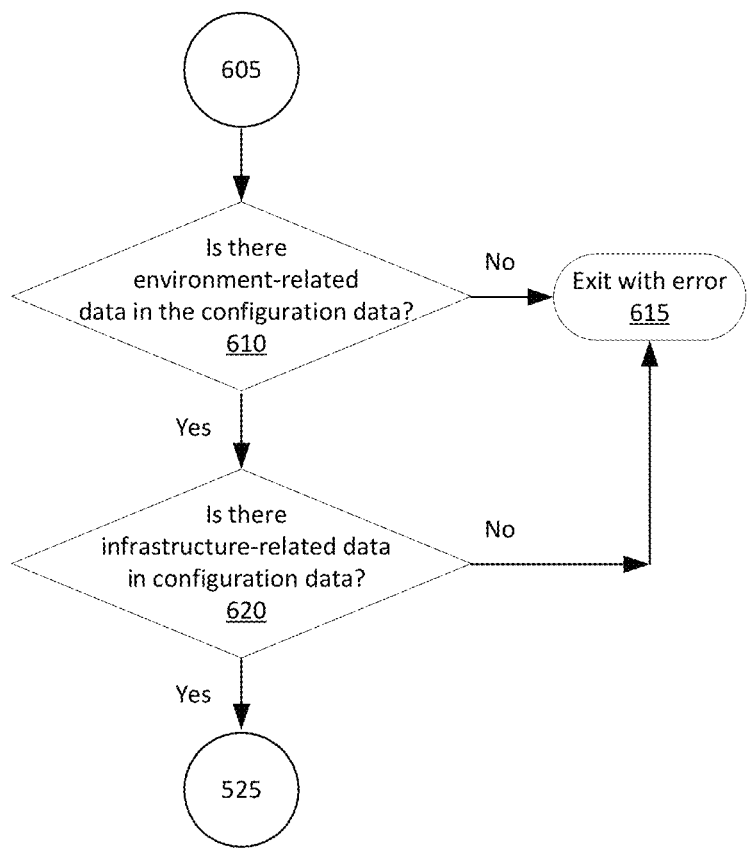
FIGS. 6A and 6B show example flow diagrams of processes that may be used to verify different conditions when deploying a service, in accordance with some implementations.

In some implementations, the process of diagram 500 may flow from block 520 to connecting point 605 of FIG. 6A where the configuration data 305 may be verified. Referring to FIG. 6A, at block 610, a test may be performed to determine whether the configuration data 305 includes environment-related data 405. When the environment-related data 405 is missing in the configuration data 305, the process may end at block 615, and an error notification may be generated. When the environment-related data 405 is in the configuration data 305, a test may be performed to determine whether the configuration data 305 includes infrastructure-related data 410 at block 620. When the infrastructure-related data 410 is missing in the configuration data 305, the process may end at block 615, and an error notification may be generated. When the infrastructure-related data 410 is in the configuration data 305, the process may continue at block 525 of FIG. 5. At block 525, the packaged service may be updated using the environment-related data 405 and the infrastructure-related data 410 included in the configuration data 305.

Figure 6B:
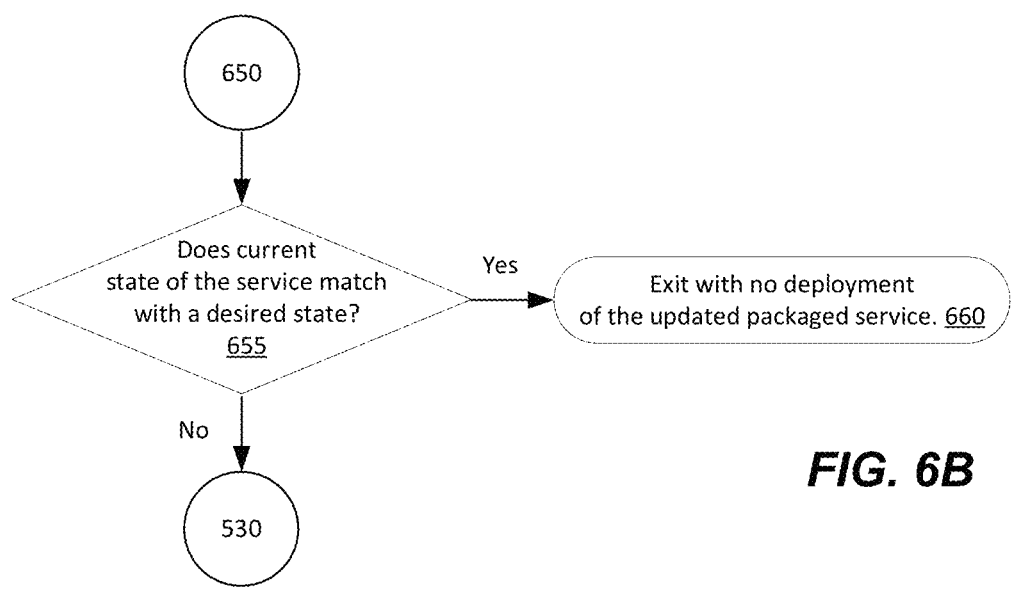

From block 525, the process of diagram 500 may flow to block 530 where the packaged service may be deployed. The deployment of the packaged service may be to a deployment destination such as a cluster environment (e.g., a Kubernetes cluster) or a local environment (e.g., local server). In some implementations, from block 525, the process of diagram 500 may flow to connecting point 650 of FIG. 6B where a test may be performed to determine whether a current state of the service match with the desired state of the service at block 655. When the current state of the service matches with the desired state, the process may end at block 660 and the deployment of the updated packaged service may not occur. When the current state of the service does not match with the desired state, the process may continue at block 530 of FIG. 5. At block 530, the updated packaged service may be deployed.

At block 535, a test may be performed to determine if the deployment of the packaged service is successful. When the deployment of the updated packaged service is successful, the process of diagram 500 may end at block 540. When the deployment is not successful, the process of diagram 500 may end at block 515, and an error notification may be generated.

Figure 7:
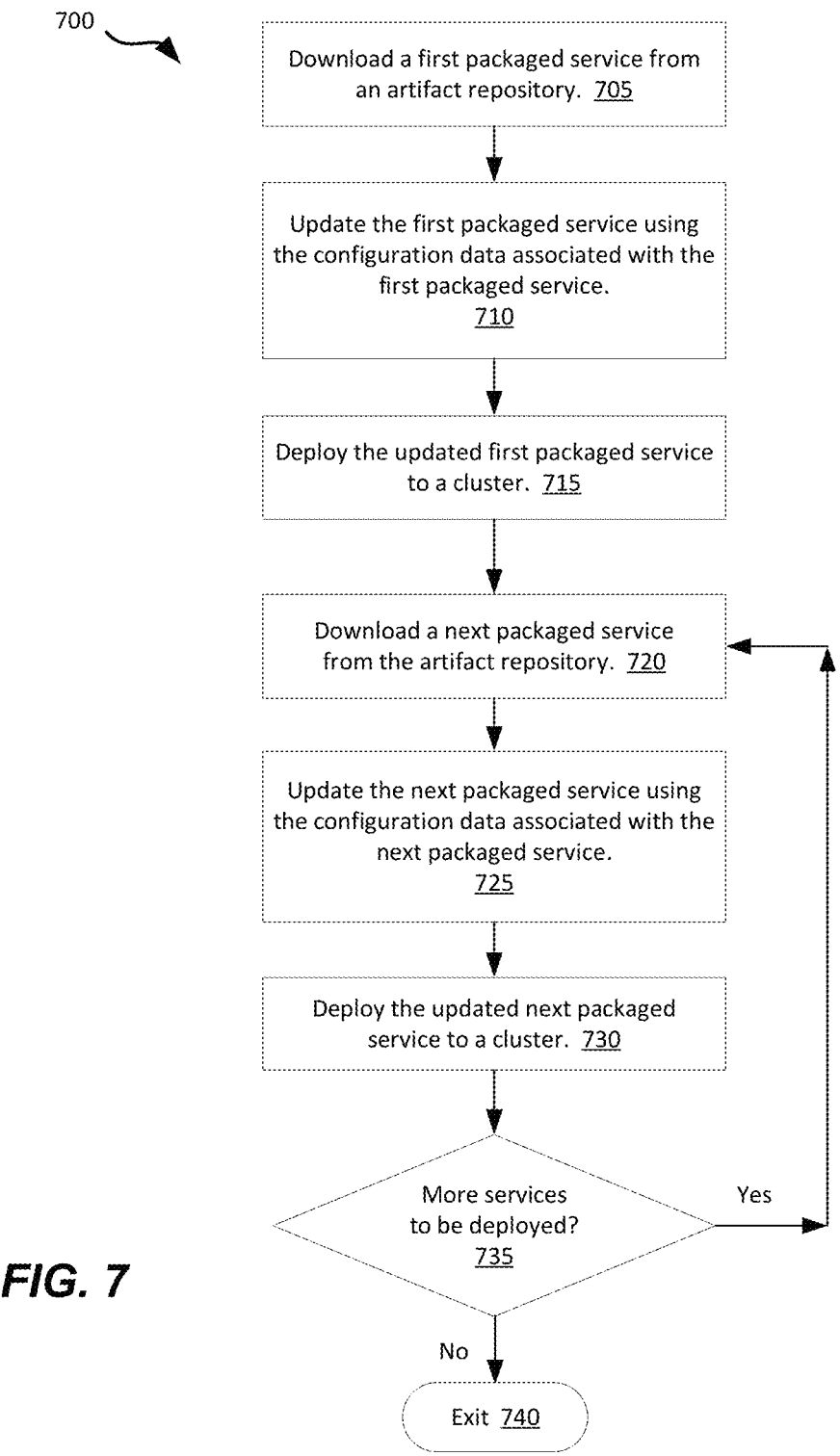
FIG. 7 shows an example flow diagram of a process that may be used to automate deployment of multiple services, in accordance with some implementations.

FIG. 7 is an example flow diagram of a process that may be used to automate deployment of multiple services, in accordance with some implementations. The process shown in diagram 700 may be associated with a deployment orchestrator. Configuration data 305 may include environment-related data 405 and infrastructure-related data 410 for multiple packaged services. As described above, a packaged service may be a Helm chart. At block 705, a first packaged service may be downloaded from an artifact repository. At block 710, the first packaged service may be updated with the configuration data 305 associated with the first packaged service. At block 715, the first packaged service may be deployed.

At block 720, a next packaged service may be downloaded from the artifact repository. At block 725, the next packaged service may be updated with configuration data 305 associated with the next packaged service. At block 730, the next packaged service may be deployed. At block 735, a test may be performed to determine whether there are more services to be deployed. This may be performed by evaluating the configuration data 305. When there are more services to be deployed, the process of diagram 700 may continue at block 720; otherwise, the process may end at block 740.

Figure 8A:
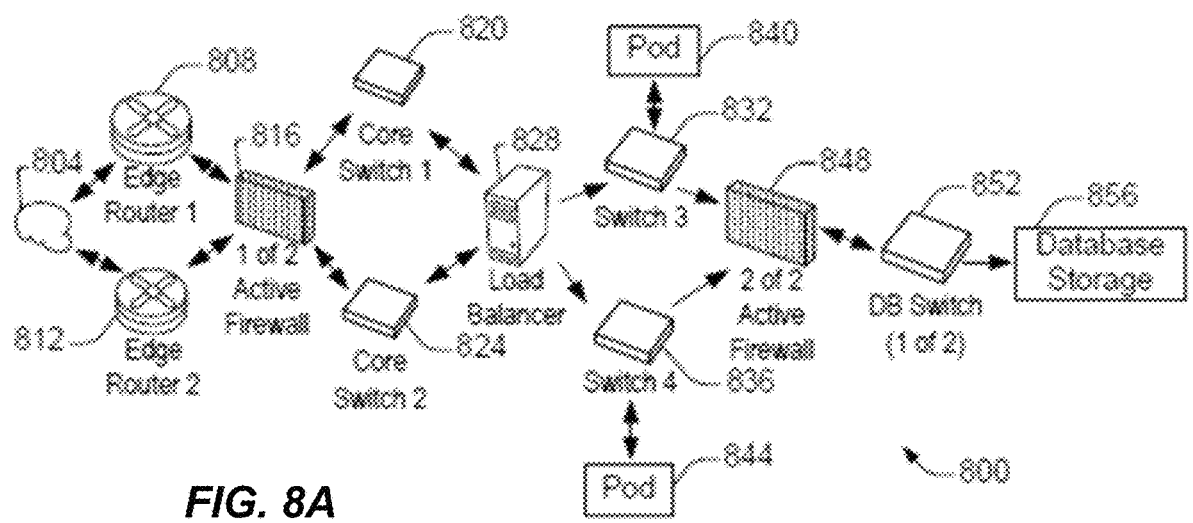
FIG. 8A shows a system diagram illustrating architectural components of an applicable environment, in accordance with some implementations.

FIG. 8A shows a system diagram 800 illustrating architectural components of an on-demand service environment, in accordance with some implementations. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
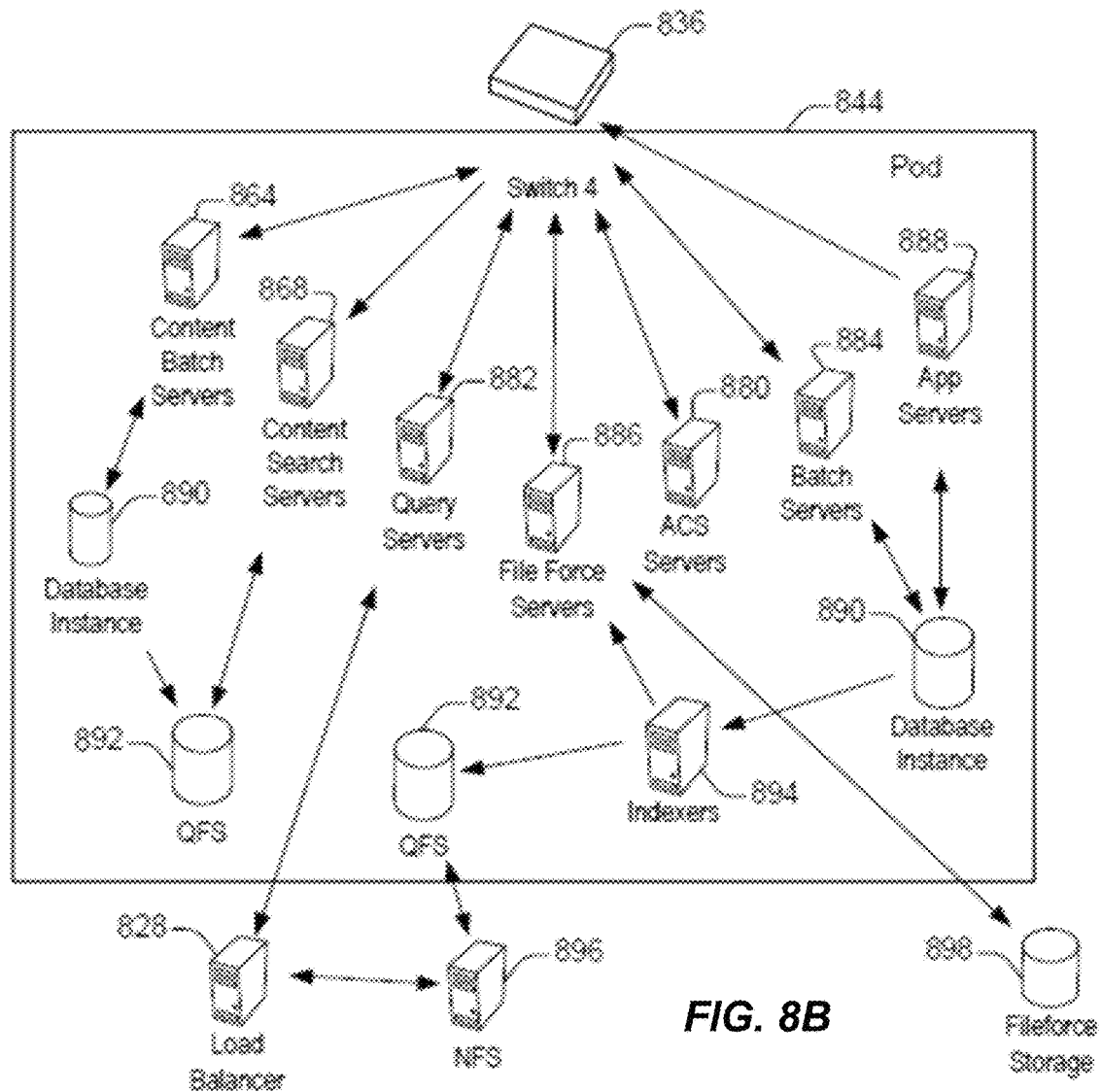
FIG. 8B shows a system diagram further illustrating architectural components of an applicable environment, in accordance with some implementations.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some implementations, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800. In some implementations, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. In some implementations, the QFS 892 may be an open source file system available from Sun Microsystems® of Santa Clara, California. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some implementations, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call. In some implementations, database information may be transmitted to the indexer 894. Indexer 894 may provide an index of information available in the database 890 and/or QFS 892. The index information may be provided to Fileforce servers 886 and/or the QFS 892.

Figure 9:
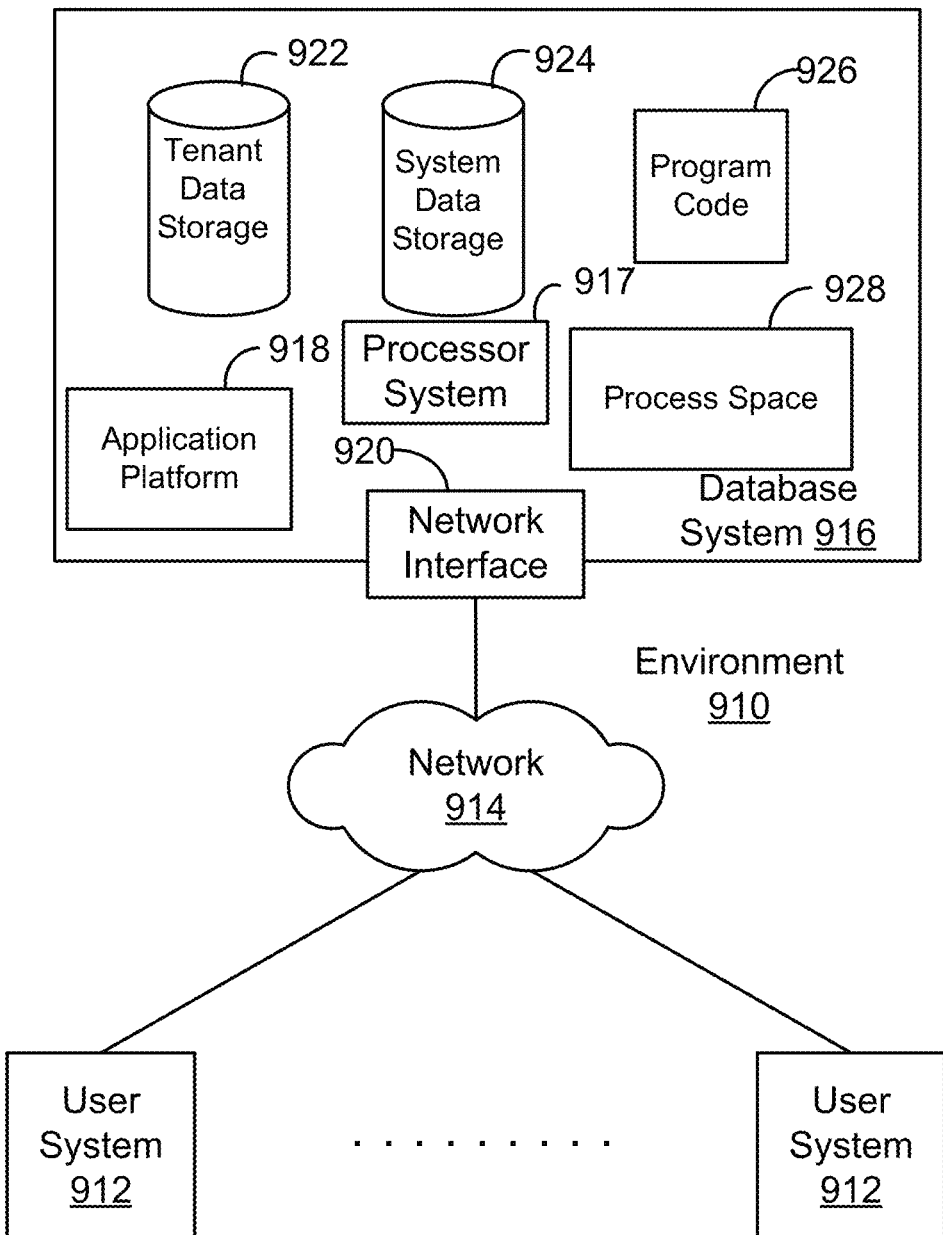
FIG. 9 shows a system diagram illustrating the architecture of a multi-tenant database environment, in accordance with some implementations.
Figure 10:
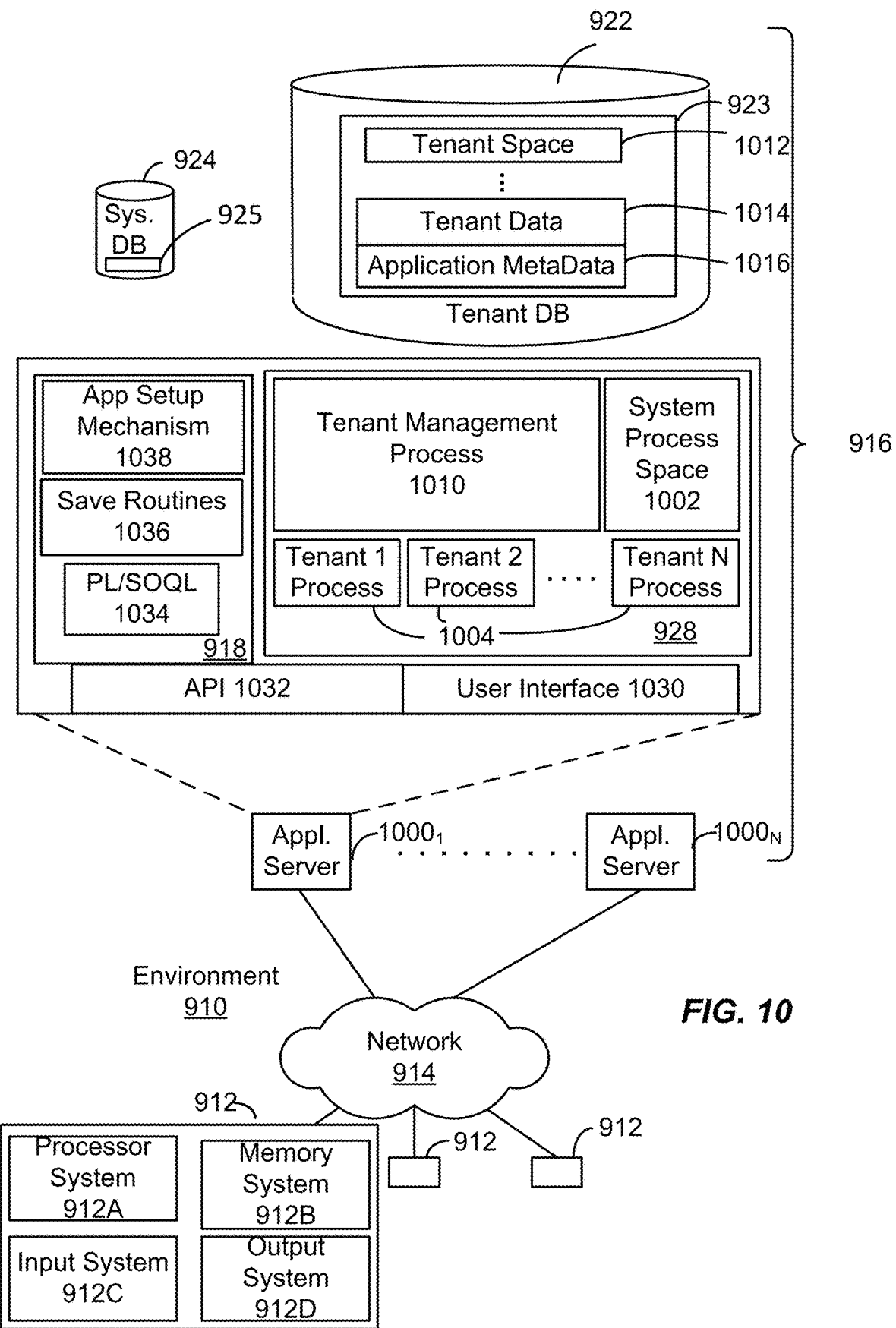
FIG. 10 shows a system diagram further illustrating the architecture of a multi-tenant database environment, in accordance with some implementations.

FIG. 9 shows a block diagram of an environment 910 wherein an on-demand database service might be used, in accordance with some implementations. Environment 910 includes an on-demand database service 916. User system 912 may be any machine or system that is used by a user to access a database user system. For example, any of user systems 912 can be a handheld computing system, a mobile phone, a laptop computer, a workstation, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 916, shown in FIG. 9, implements a web-based customer relationship management (CRM) system. For example, in some implementations, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some implementations. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some implementations, therefore, an interface system implementing a load balancing function (e.g., an F5 Big-IP load balancer) is communicably coupled between the application servers 1000 and the user systems 912 to distribute requests to the application servers 1000. In some implementations, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A system for deploying services, the system comprising:
    a database system implemented using a server computing system, the database system configurable to cause:
    executing, in a computing environment, a deployment orchestrator to orchestrate deployment of services, the deployment orchestrator retrieved from an artifact repository, the deployment orchestrator implemented in a container including a plurality of libraries, the execution of the deployment orchestrator being configurable using a configurable run command having a plurality of options including: a location of the deployment orchestrator, one or more configuration files, a service name, and a username and a password for the artifact repository;
    accessing, by the executing deployment orchestrator, configuration data stored in the artifact repository, the configuration data associated with a service to be deployed, the configuration data generated independently of the service and including environment-related data and infrastructure-related data, the environment-related data identifying at least versioning information associated with the service, and the infrastructure-related data identifying at least artifact repository information associated with the service and a timeout for deployment;
    incorporating, by the executing deployment orchestrator, the configuration data into the container;
    accessing, by the executing deployment orchestrator, packaged service data of a packaged service stored in the artifact repository based on the artifact repository information, the packaged service generated by a package manager based on the service;
    updating, by the executing deployment orchestrator, the packaged service using the environment-related data and the infrastructure-related data to generate an updated packaged service, wherein the updating of the packaged service includes using at least: (i) an application version and a chart version of the versioning information identified by the environment-related data, and (ii) a namespace, a number of replicas and the timeout for deployment identified by the infrastructure-related data to expand values in the packaged service and enable the updated packaged service to be deployed to a cluster;
    determining, by the executing deployment orchestrator, a current state of packaged service deployment at the cluster;

causing, by the executing deployment orchestrator, the updated packaged service to be deployed to the cluster; and determining, by the executing deployment orchestrator, after passage of the timeout identified by the infrastructure-related data, whether deployment of the updated packaged service was successful.

2. The system of claim 1, wherein the updated packaged service is to be deployed to the cluster using a deployment manager associated with the package manager.

3. The system of claim 2, wherein the cluster is one of a cluster environment and a local environment.

4. The system of claim 1, wherein the accessing the configuration data is triggered by a triggering event in a continuous integration/continuous delivery (CI/CD) pipeline, the triggering event related to deploying the service to the cluster.

5. The system of claim 4, further comprising:
generating a first error notification based on determining that the configuration data does not include the environment-related data; and
generating a second error notification based on determining that the configuration data does not include the infrastructure-related data.

6. The system of claim 5, wherein the packaged service is a generic packaged service, and wherein the generic packaged service is updated to include at least the environment-related data to generate the updated packaged service.

7. The system of claim 6, wherein the environment-related data and the infrastructure-related data include data related to multiple services including a first service and a second service, wherein an updated packaged service associated with the first service is to be deployed based on configuration data associated with the first service, and wherein an updated packaged service associated with the second service is to be deployed based on configuration data associated with the second service.

8. A computer-implemented method comprising:
executing, in a computing environment, a deployment orchestrator to orchestrate deployment of services, the deployment orchestrator retrieved from an artifact repository, the deployment orchestrator implemented in a container including a plurality of libraries, the execution of the deployment orchestrator being configurable using a configurable run command having a plurality of options including: a location of the deployment orchestrator, one or more configuration files, a service name, and a username and a password for the artifact repository;
accessing, by the executing deployment orchestrator, configuration data stored in the artifact repository, the configuration data associated with a service to be deployed, the configuration data generated independently of the service and including environment-related data and infrastructure-related data, the environment-related data identifying at least versioning information associated with the service, and the infrastructure-related data identifying at least artifact repository information associated with the service and a timeout for deployment;
incorporating, by the executing deployment orchestrator, the configuration data into the container;
accessing, by the executing deployment orchestrator, packaged service data of a packaged service stored in the artifact repository based on the artifact repository information, the packaged service generated by a package manager based on the service;

updating, by the executing deployment orchestrator, the packaged service using the environment-related data and the infrastructure-related data to generate an updated packaged service, wherein the updating of the packaged service includes using at least: (i) an application version and a chart version of the versioning information identified by the environment-related data, and (ii) a namespace, a number of replicas and the timeout for deployment identified by the infrastructure-related data to expand values in the packaged service and enable the updated packaged service to be deployed to a cluster;
determining, by the executing deployment orchestrator, a current state of packaged service deployment at the cluster;
causing, by the executing deployment orchestrator, the updated packaged service to be deployed to the cluster; and
determining, by the executing deployment orchestrator, after passage of the timeout identified by the infrastructure-related data, whether deployment of the updated packaged service was successful.

9. The method of claim 8, wherein the updated packaged service is to be deployed to the cluster using a deployment manager associated with the package manager.

10. The method of claim 9, wherein the cluster is one of a cluster environment and a local environment.

11. The method of claim 8, wherein the accessing the configuration data is triggered by a triggering event in a continuous integration/continuous delivery (CI/CD) pipeline, the triggering event related to deploying the service to the cluster.

12. The method of claim 11, further comprising:
generating a first error notification based on determining that the configuration data does not include the environment-related data; and
generating a second error notification based on determining that the configuration data does not include the infrastructure-related data.

13. The method of claim 12, wherein the packaged service is a generic packaged service, and wherein the generic packaged service is updated to include at least the environment-related data to generate the updated packaged service.

14. The method of claim 13, wherein the environment-related data and the infrastructure-related data include data related to multiple services including a first service and a second service, wherein an updated packaged service associated with the first service is to be deployed based on configuration data associated with the first service, and wherein an updated packaged service associated with the second service is to be deployed based on configuration data associated with the second service.

15. A computer program product comprising a non-transitory computer-readable medium storing computer-readable program code to be executed by one or more processors, the program code including instructions to:
execute, in a computing environment, a deployment orchestrator to orchestrate deployment of services, the deployment orchestrator retrieved from an artifact repository, the deployment orchestrator implemented in a container including a plurality of libraries, the execution of the deployment orchestrator being configurable using a configurable run command having a plurality of options including: a location of the deployment orchestrator, one or more configuration files, a service name, and a username and a password for the artifact repository;

access, by the executing deployment orchestrator, configuration data stored in the artifact repository, the configuration data associated with a service to be deployed, the configuration data generated independently of the service and including environment-related data and infrastructure-related data, the environment-related data identifying at least versioning information associated with the service, and the infrastructure-related data identifying at least artifact repository information associated with the service and a timeout for deployment;

incorporate, by the executing deployment orchestrator, the configuration data into the container;

access, by the executing deployment orchestrator, packaged service data of a packaged service stored in the artifact repository based on the artifact repository information, the packaged service generated by a package manager based on the service;

update, by the executing deployment orchestrator, the packaged service using the environment-related data and the infrastructure-related data to generate an updated packaged service, wherein the updating of the packaged service includes using at least: (i) an application version and a chart version of the versioning information identified by the environment-related data, and (ii) a namespace, a number of replicas and the timeout for deployment identified by the infrastructure-related data to expand values in the packaged service and enable the updated packaged service to be deployed to a cluster;

determine, by the executing deployment orchestrator, a current state of packaged service deployment at the cluster;

cause, by the executing deployment orchestrator, the updated packaged service to be deployed to the cluster; and determine, by the executing deployment orchestrator, after passage of the timeout identified by the infrastructure-related data, whether deployment of the updated packaged service was successful.

16. The computer program product of claim 15, wherein the updated packaged service is to be deployed to the cluster using a deployment manager associated with the package manager.

17. The computer program product of claim 16, wherein the cluster is one of a cluster environment and a local environment.

18. The computer program product of claim 17, wherein the configuration data is accessed based on a triggering event in a continuous integration/continuous delivery (CI/CD) pipeline, the triggering event related to deploying the service to the cluster.

19. The computer program product of claim 18, further comprising instructions to:
generate a first error notification based on determining that the configuration data does not include the environment-related data; and
generate a second error notification based on determining that the configuration data does not include the infrastructure-related data.

20. The computer program product of claim 15, wherein the environment-related data and the infrastructure-related data include data related to multiple services including a first service and a second service, wherein an updated packaged service associated with the first service is to be deployed based on configuration data associated with the first service, and wherein an updated packaged service associated with the second service is to be deployed based on configuration data associated with the second service.

\* \* \* \* \*